United States Patent [19]

Nowottny

[11] Patent Number: 4,932,771
[45] Date of Patent: Jun. 12, 1990

[54] SELF-OPENING SPECTACLE FRAME

[75] Inventor: Norbert Nowottny, Leonberg, Fed. Rep. of Germany

[73] Assignee: Marwitz & Hauser GmbH, Stuttgart, Fed. Rep. of Germany

[21] Appl. No.: 336,915

[22] Filed: Apr. 12, 1989

[30] Foreign Application Priority Data

Apr. 14, 1988 [DE] Fed. Rep. of Germany ... 8804928[U]

[51] Int. Cl.⁵ .................................................. G02C 5/16
[52] U.S. Cl. ..................................... 351/113; 351/153
[58] Field of Search ....................... 351/113, 153, 158; 16/228

[56] References Cited

U.S. PATENT DOCUMENTS 2,853,924 9/1958 Herzfeld et al. .................... 351/113

FOREIGN PATENT DOCUMENTS

| 85744 | 8/1895 | Fed. Rep. of Germany . |
| 7135534 | 3/1972 | Fed. Rep. of Germany . |
| 270560 | 5/1927 | United Kingdom . |
| 423641 | 2/1935 | United Kingdom . |
| 995963 | 6/1965 | United Kingdom . |

Primary Examiner—Paul M. Dzierzynski
Attorney, Agent, or Firm—Walter Ottesen

[57] ABSTRACT

The invention is directed to a self-opening spectacle frame wherein the spectacle temples are opened into the position for use via an elastic element with the elastic element not being visible in this position.

8 Claims, 2 Drawing Sheets

SELF-OPENING SPECTACLE FRAME

FIELD OF THE INVENTION

The invention relates to a spectacle frame having spectacle temples which self open under the action of an elastic element when the spectacles are taken out of a spectacle case.

BACKGROUND OF THE INVENTION

Spectacle frames with self-opening spectacle temples are long known. A frame of this kind is already known from German Patent 85,744 wherein the opening mechanism is realized by means of an outlying wire which bends when collapsing the temples and by the tension force developed in this manner.

In a solution known from British Patent 995,963, the opening mechanism is realized by two leaf springs without having a defined end position. Spectacle frames are described in British Patent 270,560 and U.S. Pat. No. 2,853,924 wherein an exposed helical spring around the temple joint generates the necessary tension for opening the spectacle temples.

A spectacle frame is known from British Patent 423,641 and German Utility Model Registration 7,135,534 wherein a spring is accommodated in the hinge joint (temple joint) which pretensions the hinge. Whereas all of the previously mentioned solutions have the disadvantage that they have outlying tension elements for which the danger is present of an unpleasant snagging of hair, the last-mentioned variation has the disadvantage of the danger that the very thin spring wire can break.

SUMMARY OF THE INVENTION

It is an object of the invention to provide an opening mechanism for the spectacle temples of a spectacle frame of adequate stability which is hidden when worn and for which the opening force is generated when closing the spectacle temples against the spectacle frame.

The spectacle frame of the invention is to be worn by a wearer and includes: a frame having two lens holders; two temples; first hinge means and second hinge means for pivotally connecting the temples to corresponding ones of the lens holders; each of the hinge means defining a pivot axis about which the temple pivots between a first position at which the temple lies against the frame and a second position at which the temple is swung out thereby making the spectacle frame ready for use by the wearer; and, each of the hinge means including: housing means formed within the frame and within the temple corresponding thereto; an elastic member having first and second ends and being disposed in the housing means so as to be substantially hidden from view and having an elasticity adjusted so as to cause the elastic member to be stressed when in the first position with a bias sufficient to pivot the temple into the second position; and, first and second attachment means for attaching the ends of the elastic member to the frame and the temple, respectively.

The advantage of the invention is that it provides self-opening spectacle frames for the first time which satisfy the requirements with respect to functionality as well as the requirements of wearing safety. There is no danger that hair will be snagged in the region of the hinge because the opening mechanism is completely enclosed by the temple and frame material when the spectacle temples are opened, that is, when the spectacle frame is worn.

The elastic member can be configured as a tension or compression element depending upon on which side of the temple hinge it extends. It can, for example, be configured as a helical spring, an elastic bendable leaf spring, elastic plastic or a rubber piece. If a helical spring is used, it is advantageous to encase the latter with an elastic tube-shaped casing as protection against contamination. In order to obtain a desired defined end position of the spectacle temples and thereby prevent a folding of the temples beyond the desired end position, the temples and frame are so configured that they lie tightly against each other in the end position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
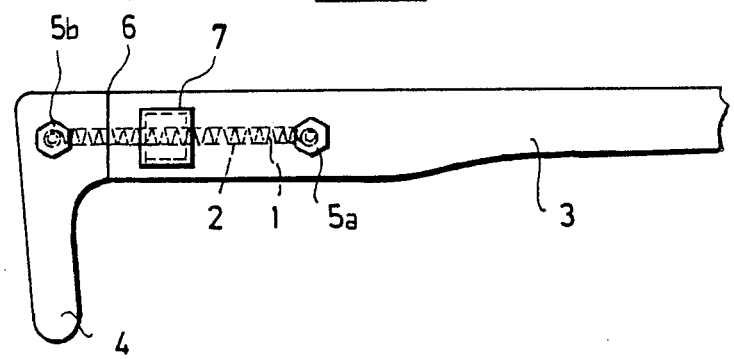
FIG. 1 is a side elevation view of a spectacle frame having a self-opening spectacle temple according to an embodiment of the invention.

The side view of spectacles having self-opening temples is seen in FIG. 1. A spring 1 is arranged in a spring channel 2 which extends in the interior of the temple 3 as well as in the interior of frame 4. Two screws (5a, 5b) hold the spring 1 in the spring channel or bore-like opening 2 with the loops 11 provided at the ends of the spring 2. The spectacle temple 3 lies tightly against the frame 4 in the open condition. For this condition, the spring 1 is hidden so that it can no longer be seen.

Figure 2:
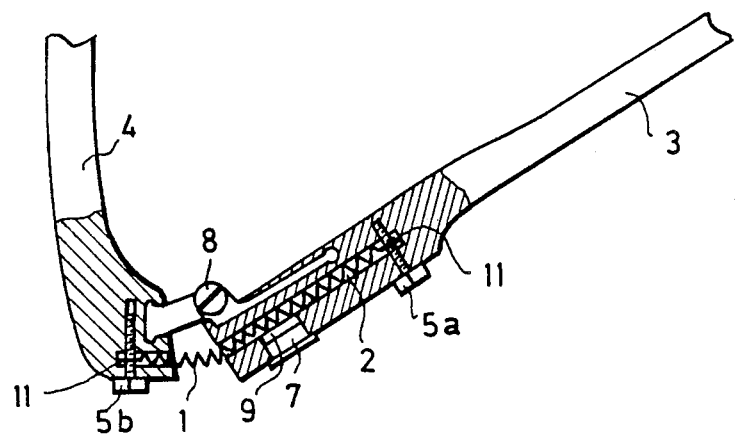
FIG. 2 is a view of the hinge region of the spectacle frame of FIG. 1 seen from above and partially in section with a self-opening spectacle temple shown in the half-opened position.

In FIG. 2, the spectacle frame of FIG. 1 is shown in the half-opened condition of the temple 3. A hinge arranged between the frame 4 and the spectacle temple 3 provides for a rigid movement of the spectacle temple 3 in a plane when opening and closing. The rotational axis of the hinge is designated by 8. In order to pretension the spring 1, an opening 9 is provided in the spectacle temple 3 which, after tensioning, is closed by means of an insert element 7. The pretensioning of the spring 1 occurs in that the spring 1 is fixed at one end 11, preferably at the temple 3, with the screw 5a and is then engaged with a sharp object through the opening 9 and stretched before it is attached at the other end with the screw 5b.

Figure 3:
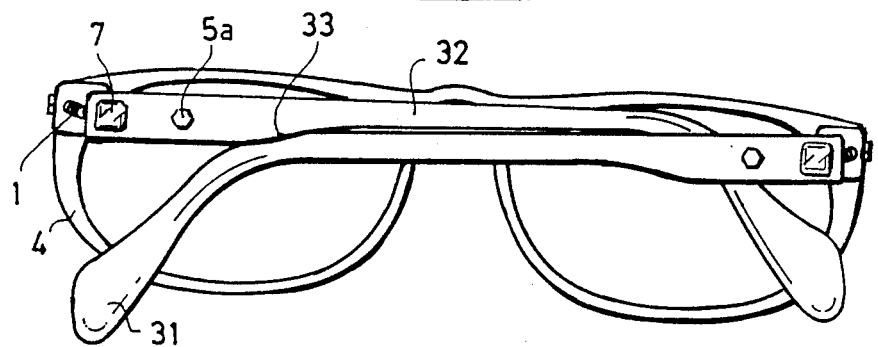
FIG. 3 is a rear elevation view of a folded spectacles showing the self-opening spectacle temples latched in the closed position; and, FIG. 4 is a view of the hinge region generally corresponding to FIG. 2 of another embodiment of the invention wherein the helical spring is provided with a tubular elastic casing.

Collapsed spectacles having self-opening spectacle temples (31, 32) can be seen in FIG. 3. The spectacle temples (31, 32) are configured such that the one temple 31 engages at a point 33 beneath the other temple 32. In this way, both spectacle temples (31, 32) remain in a defined position when the spectacles is collapsed. This latching can be released with one hand. Thereafter, the spectacle temples (31, 32) self-open and bring the spectacle into the position for use.

Figure 4:
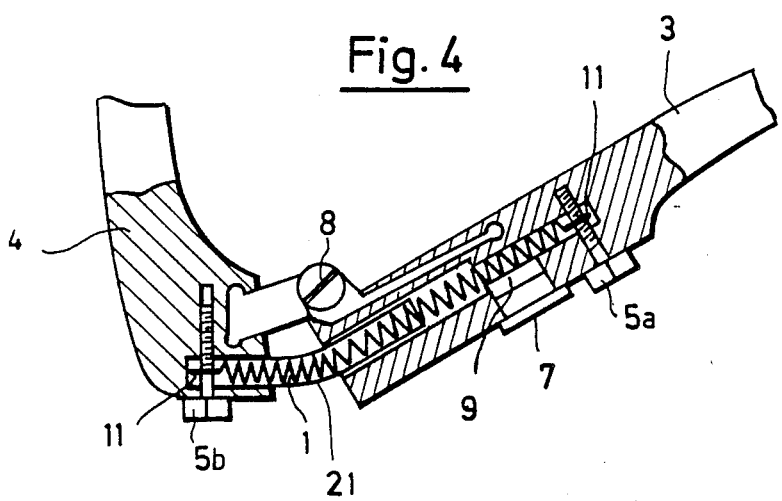

For the embodiment illustrated in FIG. 4, the spring 1 is covered with a tube-shaped elastic casing 21. The material and the dimensioning of the casing 21 is such that the spring 1 is surrounded as tightly as possible; however, the elastic material does not irreversibly penetrate into the spring 1 when the spring is fully expanded. In order to pretension the spring 1 without damaging the casing 21, the opening 9 for tensioning the spring 1 is displaced in the direction toward the spring end 11 in the temple 3. Here too, the opening 9 is not left open; instead, it is closed by means of an insert element 7 as in FIG. 2. The spring channel 2 is dimensioned such that the spring channel does not develop any resistance against the spring 1 with its casing 21 when pivotally moving the temple 3.

It is understood that the foregoing description is that of the preferred embodiments of the invention and that various changes and modifications may be made thereto without departing from the spirit and scope of the invention as defined in the appended claims.

What is claimed is:

1. A spectacle frame to be worn by a wearer, the spectacle frame comprising:

a frame having two lens holders;
   two temples;
   first hinge means and second hinge means for pivotally connecting said temples to said frame near corresponding ones of said lens holders;
   each of said hinge means defining a pivot axis about which the temple pivots between a first position at which the temple lies against the frame and a second position at which the temple is swung out thereby making the spectacle frame ready for use by the wearer; and,
   each of said hinge means including: a first bore-like opening formed within said frame and a second bore-like opening formed within the temple corresponding thereto; an elongated elastic member having a first end portion disposed in said first bore-like opening and a second end portion disposed in said second bore-like opening so as to be entirely hidden from view when said temples are in said second positions, respectively, and said elastic member having an elasticity adjusted so as to cause said elastic member to be stressed when in said first position with a bias sufficient to pivot the temple into said second position; and, attachment means for attaching at least one of said end portions to one of said frame and said temple.

2. The spectacle frame of claim 1, said first and second bore-like openings of each of said hinge means being formed in said frame and said temple so as to cause said elastic member to be disposed laterally of said pivot axis.

3. The spectacle frame of claim 1, said elastic member being configured so as to define said pivot axis.

4. The spectacle frame of claim 1, said elastic member being a spring.

5. The spectacle frame of claim 1, said first and second bore-like openings being respective bores formed in the temple and the frame; said elastic member being an elongated spring disposed in said bores; each of said hinge means further including an elastic tube-like casing disposed in surrounding relationship to said spring.

6. The spectacle frame of claim 1, said temples being configured to conjointly define snap latch means for holding said spectacle frame in the collapsed condition when the temples are folded into their respective first positions.

7. A spectacle frame to be worn by a wearer, the spectacle frame comprising:

a frame having two lens holders;
   two temples;
   first hinge means and second hinge means for pivotally connecting said temples, respectively, to said frame near corresponding ones of said lens holders;
   each of said hinge means defining a pivot axis about which the temple pivots between a first position at which the temple lies against the frame and a second position at which the temple is swung out thereby making the spectacle frame ready for use by the wearer; and,
   each of said hinge means including: housing means formed within said frame and within the temple corresponding thereto; a spring having first and second ends and being disposed in said housing means so as to be substantially hidden from view and having an elasticity adjusted so as to cause said elastic member to be stressed when in said first position with a bias sufficient to pivot the temple into said second position; and, attachment means for attaching said ends to said frame and said temple, respectively;
   said housing means being respective channels formed in the temple and the frame; said spring being an elongated member disposed in said channels; each of said hinge means further including an elastic tube-like casing disposed in surrounding relationship to said spring;
   said attachment means including: a first holder disposed in said temple for holding said spring at one of said ends and a second holder disposed in the frame for holding said spring at the other one of said ends thereof; and, access means formed in one of said temple and said lens holder for providing access to the channel formed therein to permit the spring to be pretensioned.

8. The spectacle frame of claim 7, said access means comprising an opening formed in one of said temple and lens holder; and, a cover for covering said opening.

* * * * *